May 17, 1938.  B. L. MATTHEWS ET AL  2,118,013

GAS VALVE

Filed June 30, 1934

INVENTORS
John T. Marvin and
Birchard L. Matthews
BY
ATTORNEY

Patented May 17, 1938

2,118,013

UNITED STATES PATENT OFFICE 2,118,013

GAS VALVE

Birchard L. Matthews, Cleveland, and John T. Marvin, Fairview Village, Ohio, assignors to The Patrol Valve Company, Cleveland, Ohio, a corporation of Ohio Application June 30, 1934, Serial No. 733,266

1 Claim. (Cl. 251—77)

This invention relates to the control of gases by variation of the size of an orifice through which the gas flows. It is particularly applicable where the size of the orifice is necessarily small, or minute.

In many gases, there are deposits, that collect in the fittings through which the gas flows, and tend to obstruct the passageways. As examples, in the use of fuel and illuminating gases there may be pure carbon precipitated out by some chemical activity. Or there may be gums deposited from the gas. Also there frequently are foreign substances in the gas lines that may collect and obstruct the passages.

In gas appliances there are valves and the like used, that of necessity permit the flow of only very small quantities of gas. Illustrative of this is the pilot burner control. The orifice in a pilot control valve may be as small as .025 inch before adjustment, and as adjusted may be only a small fraction of that. It is readily comprehensible that clogging of this tiny port presents a problem of serious proportions.

The ideal orifice is that having the largest minimum dimension for a given total area. This is a circle. For practical reasons it is almost impossible to obtain a valve in which the area of the orifice may be varied and maintain its true circular character throughout the range of adjustment. Consequently approaches must be made to obtain, as nearly as possible, this ideal form.

Heretofore one of the principal types of valves used for such minute flows of gas, has been the needle valve. Despite any other advantages, this type of valve provides one of the most inefficient orifices, since its shape is annular, and its minimum dimension is the radial distance across the annulus. If the diameter of the orifice is .025 inch, the minimum dimension may be as low as .0024 of an inch, in use.

It is an object of this invention to provide a valve applicable to control a small flow of gas, the quantity of which may be varied, but without reducing the size of the port to such dimension that it may be clogged.

It is a further object of this invention to provide a valve that is readily adjustable, and cheap in construction.

It is a further object of the invention to provide a valve that, in addition to an adjusting means, has a complete shut-off.

It is in addition, an object of the invention to provide a valve of this type having an orifice that may be varied but the shape of which remains substantially an ellipse.

It is a further object to provide a valve of this type having an elliptical orifice, the size of which is adjustable by a member travelling along its major axis.

With these and other objects in view, the invention is as follows: in the drawing.

Figure 1:
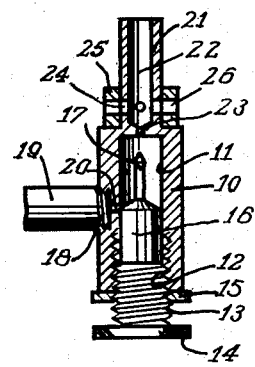
Figure 1 is a sectional view of one form of the device.

Referring to Figure 1, 10 is a valve body having a bore 11 herein, preferably of cylindrical form. This bore is threaded at the open end, as at 12 to receive a correspondingly threaded member 13, adapted to be screwed into or out of bore 11 by knurled handle 14, and fixed in desired position by a lock nut 15. To the inner end of member 13 is attached a piston or slide 16, having a close fit with the bore 11. Superposed on this slide is a pin 17 having a point thereon. The purpose for these elements will be shown hereafter.

In one wall of housing 10 is a threaded bore 18 penetrating nearly through the wall. This bore receives inlet tube 19 connected to a gas supply. Communication to the bore 11 is established by an orifice 20, shown in Figure 1 as a hole drilled perpendicularly to the axis of bore 11.

On the closed end of housing 11 is an extension 21 having therein a mixing chamber 22. Gas enters chamber 22 from bore 11 in the form of an injection from orifice 23. The injection jet entrains air through side ports 24 of extension 21, the size of which may be varied by rotation of sleeve 25 having ports 26 adapted to be registered to a greater or less degree with ports 24.

In operation, gas enters through inlet pipe 19, and orifice 20 to bore 11. The principal effect of orifice 20 is to reduce the pressure of the entering gas, and consequently this orifice need not be as small as an orifice having the combined function of reducing pressure and also reducing the quantity of gas flowing. Orifice 20 is preferably designed to be substantially a thin plate orifice. Although this last factor contributes to the efficiency of the valve; the lack of it does not destroy the valve's operativeness.

Gas pressure in bore 11, then, is reduced from line pressure. From bore 11 it passes through the small orifice 23, which produces a jet entering mixing chamber 22 that will entrain air through ports 24 and pass out of chamber 22 as a blue flame mixture.

The adjustment of orifice 20 is effected by rotation of handle 14, which reciprocates the piston or slide 16 so that the latter crosses the orifice and reduces the size thereof. Clearly this intersection produces less chance of clogging than does that involving a needle adjustment. Actually, for a corresponding orifice area, the maximum transverse dimension of this orifice is some three times that of a needle valve for a given area of .000164 square inch. This calculation is based upon an initial orifice size for orifice 20 identical with that of a needle valve orifice having the dual function abovementioned; whereas actually port 20 may be larger than such an orifice by virtue of its being chiefly for pressure reduction.

Should it be desired to shut the gas completely off, and should piston 16 be somewhat worn, the handle 14 is rotated until the point on pin 17 engages in orifice 23 to shut the same off.

Figure 2:
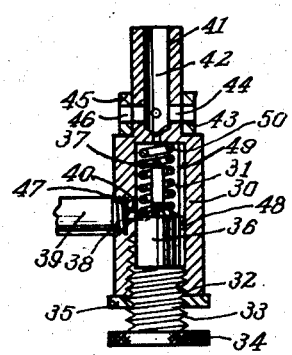
Figure 2 is a similar view of a second form of valve.
Figure 3:
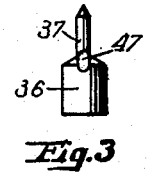
Figure 3 is an elevation of the valve plug of Figure 2.

In the valve shown in Figure 2, the intersection between the slide and the orifice is substantially elliptical. This increases the transverse dimension even beyond that shown in Figure 2, wherein the orifice is the shape of a circular segment.

Details of this valve are as follows: The valve body 30 has a bore 31, preferably cylindrical, therein. The open end of body 30 is threaded as at 32 to receive a correspondingly threaded member 33 having a handle 34 whereby it may be screwed into or out of bore 31. A lock nut 35 is provided to secure the threaded member in adjusted position. In this valve the piston or slide 36 is separate from member 33, and does not rotate therewith. The piston has pin 37, corresponding to pin 17 of Figure 1.

An inlet tube 39 is threaded into opening 38 in the valve body, and orifice 40 is provided to conduct gas from tube 39 to bore 31. An extension 41 having mixing chamber 42 is provided on body 30. Gas flows through orifice 43 from bore 31 to mixing chamber 42, entraining air from ports 44, the size of which is adjusted by registerable ports 46 on rotatable sleeve 45.

Piston 36 is provided with a gouged out portion 47, that may be formed by drilling into the piston or by other suitable means. This portion 47 is adapted to register with orifice 40, so that the intersection, or ultimate orifice is in the nature of an ellipse. More exactly, it is the shape of two intersecting arcs. This provides a maximum transverse dimension larger than that of Figure 1.

It will be seen that piston 36 must be prevented from rotation. This is provided by making it separate from member 33, and by providing a key and slot engagement between piston 36 and body 31. Piston 36 has a pin 48 engaging in slot 49 in the body 30. To insure that piston 36 will follow member 33 upon the latter's being retracted, a spring 50 is provided, as shown.

The operation of this valve is identical with that of Figure 1, the only difference being in structure.

Figure 4:
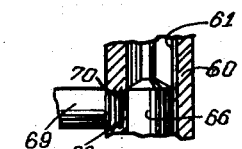
Figure 4 shows a modification adaptable to either valve.
Figure 5:
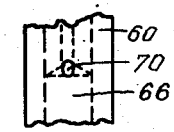
Figure 5 shows in diagrammatic form the manner of adjustment of the orifice of Figure 4.
Figure 6:
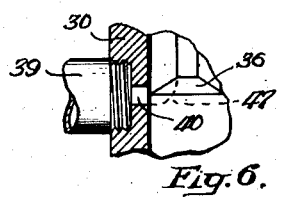
Figure 6 is an enlarged fragmentary cross-sectional view of the portion of the improved valve including the inlet opening and plug co-operating therewith.

The modification shown in Figures 4 and 5 is applicable to either Figure 1 or Figure 2. In this the valve body is shown at 60, with a bore 61 and a piston 66 slidable therein. An inlet tube 69 is provided, threaded into opening 68. Communication between tube 69 and bore 61 is effected through orifice 70. The orifice is drilled at an acute angle to the axis of the bore. This provides an intersection with the inner surface of bore 11 that is elliptical, as shown in Figure 5. The wall through which orifice 70 extends is preferably thin, so that the orifice is in effect a thin plate orifice. It will be obvious that, by adjusting an elliptical orifice along its major axis, a larger transverse opening is provided. Quite obviously this type orifice may be employed on either valve.

It will be seen that valves have been provided that give a substantial increase in the transverse dimension of the opening over that in the usual needle valve. At the same time the valve is capable of fine adjustment. It is also cheap and simple in construction and operation.

Having described the invention, what is claimed is:

In a device of the kind described, a hollow body, an injection inlet opening leading into said body, a non-rotatable cylindrical piston in said body longitudinally slideable therein to intersect said opening, said piston having its inner end of conical shape and having a substantially arcuate cut-out in its outer surface at the junction of the cylindrical and conical surfaces thereof, said cut-out extending into said cylindrical surface beyond said junction and adapted to register with the inlet opening when the latter is full open, and said cut-out operating to reduce said inlet opening to a gradually reducing substantially elliptical passage as the piston is moved in said body across the same.

BIRCHARD L. MATTHEWS.
JOHN T. MARVIN.